(12) United States Patent
Pajard

(10) Patent No.: US 8,128,032 B2
(45) Date of Patent: Mar. 6, 2012

(54) AIRCRAFT WING INCLUDING A PLURALITY OF DISMOUNTABLE MEMBERS

(75) Inventor: Jean-Pierre Pajard, Paris (FR)

(73) Assignee: Sagem Defense Securite, Paris (FR)

( * ) Notice: Subject to any disclaimer, the term of this patent is extended or adjusted under 35 U.S.C. 154(b) by 427 days.

(21) Appl. No.: 12/523,486

(22) PCT Filed: Jan. 7, 2008

(86) PCT No.: PCT/FR2008/050014
§ 371 (c)(1),
(2), (4) Date: Aug. 18, 2009

(87) PCT Pub. No.: WO2008/099097
PCT Pub. Date: Aug. 21, 2008

(65) Prior Publication Data
US 2009/0302159 A1    Dec. 10, 2009

(30) Foreign Application Priority Data

Jan. 16, 2007   (FR) ...................................... 07 00292

(51) Int. Cl.
*B64C 1/26* (2006.01)
(52) U.S. Cl. ........................................ 244/124; 244/131
(58) Field of Classification Search .................. 244/124, 244/123.1, 131; 446/34
See application file for complete search history.

(56) References Cited

U.S. PATENT DOCUMENTS

| 3,093,075 A | 6/1963 | Edgar et al. | |
| 3,640,492 A * | 2/1972 | Star | 244/124 |
| 5,035,382 A * | 7/1991 | Lissaman et al. | 244/190 |
| 6,224,451 B1 | 5/2001 | Lai | |
| 6,425,794 B1 * | 7/2002 | Levy et al. | 446/34 |
| 2006/0091258 A1 | 5/2006 | Chi et al. | |

FOREIGN PATENT DOCUMENTS

| BE | 369 829 | 4/1930 |
| DE | 20 05 372 A1 | 8/1971 |

OTHER PUBLICATIONS

Thompson B E, et al., "Sailplane Carry-Through Structures Made With Composite Materials" Journal of Aircraft, Aiaa, Reston, VA, US, vol. 33, No. 3, (May 1, 1996), pp. 596-600.

* cited by examiner

*Primary Examiner* — Tien Dinh
*Assistant Examiner* — Michael Kreiner
(74) *Attorney, Agent, or Firm* — Miller, Matthias & Hull, LLP

(57) ABSTRACT

The invention relates to an aircraft wing including two members removably connected end to end by a coupling including: a male coupling part with spaced opposed upper and lower faces, a first face being planar while the second face has a longitudinal relief (9) with a V-shaped section, the first and second faces being mutually included towards each other at their free ends; a female coupling part with spaced upper and lower faces facing each other, a first face being planar while the second face has a longitudinal relief with a V-shaped section complementary to that of the relief, and the first and second faces being mutually inclined away from each other at their free ends; and a fastener for retaining the two parts coupled with their respective interacting faces in a mutual bearing relation.

9 Claims, 2 Drawing Sheets

AIRCRAFT WING INCLUDING A PLURALITY OF DISMOUNTABLE MEMBERS

CROSS-REFERENCE TO RELATED APPLICATIONS

This application is a U.S. national stage filing of International Patent Application No. PCT/FR2008/050014 filed on Jan. 7, 2008, which claims priority under the Paris Convention to French Patent Application No. 07 00292, filed on Jan. 16, 2007.

FIELD OF THE DISCLOSURE

The present invention relates in general to the field of winged aircraft and relates more specifically to improvements made to aircraft wing structures that have a longitudinal span and are made up of at least two wing elements arranged end to end, a first wing element being secured, dismantleably, to an adjacent second wing element using at least one coupling means.

BACKGROUND OF THE DISCLOSURE

Wings, particularly the lift-generating wings of aircraft, are elements of a large or even very large size which considerably increase the overall size of the aircraft transversely to their fuselage. For certain types of aircraft, this bulk afforded by the wings is prohibitive in some circumstances, particularly when the aircraft are being transported and/or stored.

As far as transport is concerned, certain aircraft, such as gliders, need to be transported on road vehicles (trucks or trailers) for example in order to return them to their base following a remote landing. For transport in this way, the wings (which in the case of gliders are very long) need to be able to be dismantled and stored along the fuselage. Other types of aircraft such as drones need to be transported enclosed in containers sized for loading on to trucks, which means that their wings need to be fully or partially dismantleable, so that they can be transported separately.

As far as storage is concerned, particularly in the case of long-term storage, the transverse bulk afforded by the wings presents a significant problem, whether storage is to be in a hangar (the possibility of at least partially dismantling the wings means that the hangar size can be smaller or that a greater number of aircraft can be housed in a hangar of a given surface area) or in a container (complete or partial dismantling of the wings is essential).

Admittedly there is the known folding-wing solution adopted on certain airplanes, particularly those carried on aircraft carriers, which allows an appreciable space saving, but while the fully-folding or partially-folding wing solution admittedly allows the transverse bulk to be reduced it does, because the wing is folded upward, result in an increase in the vertical bulk of the airplane. Because of this, the folding-wing solution cannot prove satisfactory when the issue is, for example, that of the road transport or containerized storage of the aircraft.

At the present time, the wings or wing portions that are dismantleable are assembled in the conventional way using bolts or studs. This means that the assembly and dismantling operations are lengthy. This is a constraint deemed unacceptable in certain applications, for example in the case of drones, the speed of deployment of which is a determining factor in their effectiveness. In other applications (for example, in the case of gliders), rapid fitting and dismantling of all or part of the wing, although not indispensable, would nonetheless be greatly appreciated. In addition, the fasteners need to be mechanically capable of withstanding the high torques to which the wing elements are subjected and need to be engineered accordingly; they are therefore bulky and heavy. Finally, the proliferation of fasteners rendered necessary to obtain the required mechanical strength makes the assembly statically redundant and this results in mechanical stresses detrimental to reliability.

An essential object of the invention is to meet practical expectations and propose a novel and relatively inexpensive technical solution to be implemented that will allow all or part of an aircraft wing to be assembled and dismantled quickly and simply while at the same time maintaining the wing's mechanical strength and ability to withstand torque while the aircraft is in flight.

SUMMARY OF THE DISCLOSURE

To these ends, the invention proposes, in an aircraft wing having a longitudinal span and consisting of at least two wing elements positioned end to end, a first wing element being secured, dismantleably, to an adjacent second wing element using at least one coupling means, for the coupling means to comprise:
  a male coupling piece borne by the first wing element substantially parallel to the longitudinal span of the wing, this male coupling piece having a mounting end for mounting on said wing element and a free end and exhibiting an upper face and a lower face which are separated from one another and face outward away from one another,
    a first of said faces being substantially planar,
    the second of said faces comprising a relief running longitudinally with a substantially V-shaped cross section, and
    said first and second faces being inclined with respect to one another so that they converge toward the second face toward its free end,
  a female coupling piece borne by the second wing element substantially parallel to the longitudinal span of the wing, this female coupling piece having a mounting end for mounting on said second wing element and a free end and exhibiting an upper face and a lower face which are separated from one another and positioned facing one another,
    a first of said faces being substantially planar,
    the second of said faces comprising a relief running longitudinally with a substantially V-shaped cross section, of a shape that complements that of the V-shaped cross section of the relief of the second face of the male coupling piece, and
    said first and second faces being inclined so that they diverge from the second face toward its free end, this inclination being the complement of that of the inclined first face of the male coupling piece, and
  retaining means capable of holding the two coupling pieces in the coupled position with their respective cooperating faces kept firmly pressed together.

By virtue of this arrangement, the coupling means, when the two coupling pieces are in the coupled position, is able to react all the torques that may be applied about the three reference axes (torque about the longitudinal axis of the wing, torque about the transverse axis of the wing, torque about the axis perpendicular to the wing) and the two wing elements are immobilized relative to one another against any relative rotation. This advantage is particularly significant in aircraft in which the wing is subjected to high stresses, not only in the vertical direction during flight (lift) but also in the longitudinal direction as it sets out (rocket or catapult launch for example) and returns (arrestor system for example).

The arrangement that has just been set out may give rise to various practical embodiments. Thus, the aforementioned respective first faces of the coupling pieces may be inclined with respect to the longitudinal span of the wing, whereas the aforementioned respective second coupling faces are substantially parallel to the longitudinal span of the wing; or alternatively the aforementioned respective second faces of the coupling pieces may be inclined with respect to the longitudinal span of the wing, whereas the aforementioned respective first coupling faces are substantially parallel to the longitudinal span of the wing; or alternatively still, the aforementioned respective first faces and respective second faces of the coupling pieces may all be inclined with respect to the longitudinal span of the wing.

In one practical embodiment which is particularly preferred for the lift-generating wings of aircraft, provision is made for the substantially planar and inclined first faces of the male and female coupling pieces respectively to be their respective upper faces, and for the faces of the respective male and female coupling pieces that are equipped with complementary reliefs to be their respective lower faces.

To make the two coupling pieces easier to assemble and prevent any damage to them that may result from poor pre-alignment, it is advantageous to contrive for the substantially planar and inclined first face of the female coupling piece to be centrally hollowed and to exhibit two bearing pads situated longitudinally on each side of the central hollow.

In terms of the practical embodiment of the reliefs provided on the respective second faces of the two, male and female, coupling pieces, there are a number of conceivable solutions. In one concrete example, the longitudinally running relief of substantially V-shaped cross section provided on the second of said faces of the male coupling piece is a groove and the longitudinally running relief of substantially V-shaped cross section of complementary shape provided on the second of said faces of the female coupling piece is a projection.

In order to form the aforementioned retaining means that holds the two coupling pieces in the coupled position it is advantageous for said coupling pieces to be pierced with holes that are transverse to their aforementioned respective first and second faces and mutually aligned when the two coupling pieces are in the coupled position in order to define at least one through-passage, and in that at least one threaded fastener is engaged through said at least one passage in order to hold the two coupling pieces in the coupled position.

In order to obtain a reliable and safe assembly of the two coupling pieces, it is preferable for the transverse holes provided in the male and female coupling pieces to define, when the two coupling pieces are in the coupled position, two through-passages longitudinally distant from one another, and for two threaded fasteners to be engaged through these two respective passages.

It is notable that the threaded fastener does not react any torque and that its sole function is to keep the two coupling pieces in their correct longitudinal position in which it is certain that the various bearing surfaces are pressed against one another. The threaded fastener can thus be made small in size, resulting in a space saving and a weight saving.

BRIEF DESCRIPTION OF THE DRAWINGS

The invention will be better understood from reading the detailed description which follows of one preferred embodiment given solely by way of nonlimiting example. In this description, reference is made to the attached drawings, in which.

DETAILED DESCRIPTION OF THE DISCLOSURE

Figure 1:
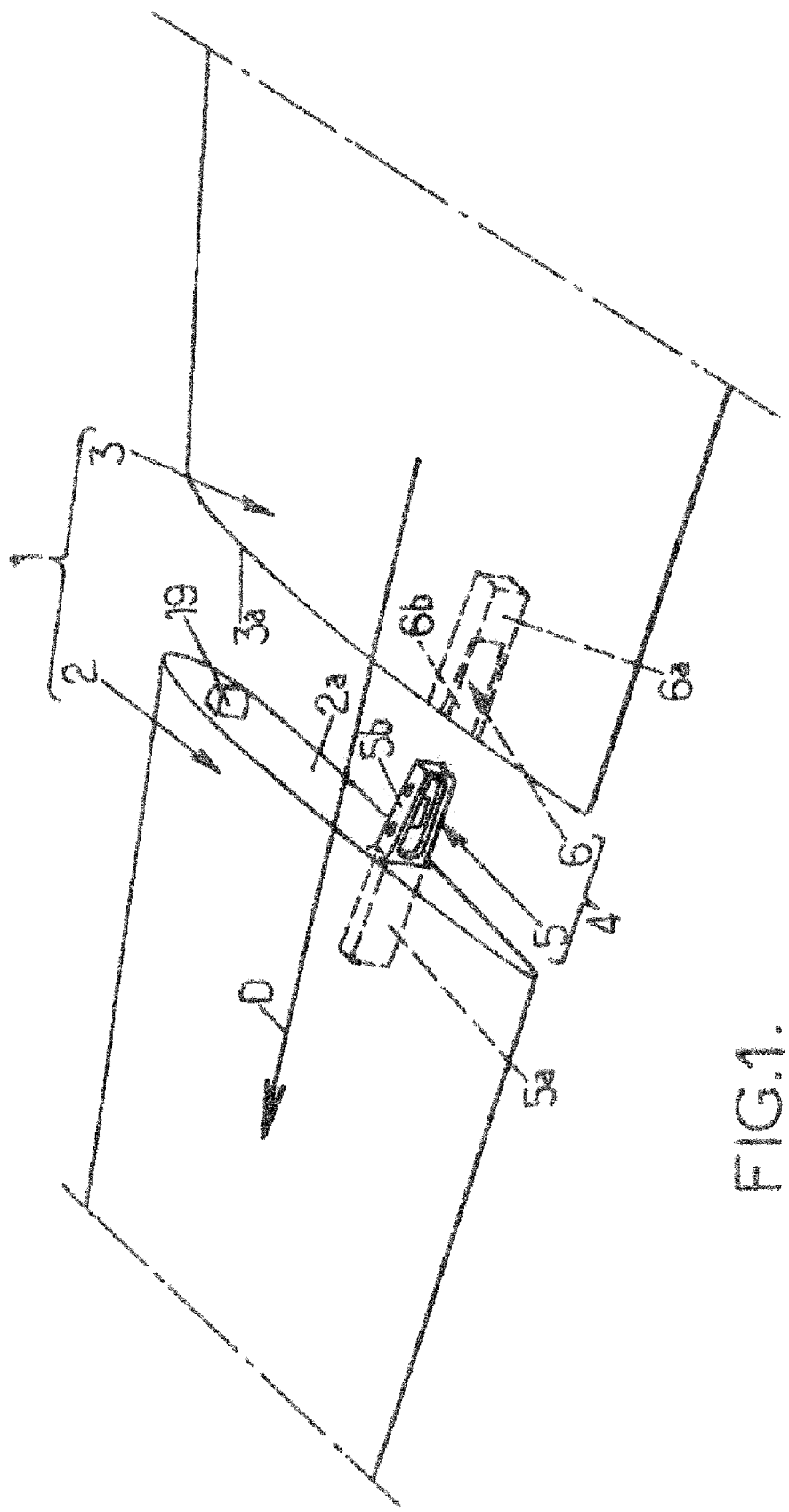
FIG. 1 very schematically depicts, in perspective, part of an aircraft wing arranged according to the invention.

FIG. 1, to which reference is made first of all, shows part of an aircraft wing 1, which wing is assumed, in the example illustrated, to be a lift-generating wing. This wing is made up of two parts (or at least two parts), namely a first wing element 2 which is removable with respect to a second wing element 3 adjacent to it and which, in practice, may be fixed: it may, for example, be secured to a fuselage of the aircraft as shown in FIG. 1, or alternatively it may quite simply be a portion of the fuselage itself or possibly a region of the fuselage that projects laterally and forms a wing stub.

According to the stated objectives, the removable wing part 3 needs to be dismantleable and assembleable quickly and without special equipment, particularly in the field in the case of an aircraft that has to be transported, for example by road, before and/or after its flight. To these ends, there is provided in accordance with the invention at least one quick coupling means 4 consisting of two, respectively one male and one female, coupling pieces able to collaborate with one another in the coupled position. These coupling pieces, notably made of metal and, for example, made of steel, are fitted to the respective transverse faces of the two wing elements, the male coupling piece 5 being supported, for example, by the transverse face 2a of the first wing element 2 and the female coupling piece 6 being supported, for example, by the transverse face 3a of the first wing element 3. The aforementioned transverse faces 2a, 3a are, in practice, substantially perpendicular to a direction D defining the longitudinal span of the wing, such that the two, male 5 and female 6, coupling pieces extend, from said respective transverse faces 2a, 3a, substantially parallel to said longitudinal span of the wing.

In order in an effective manner to provide a mechanically strong and play-free connection between the two wing elements with the torques applied to the wing elements reacted, the coupling pieces need to be secured to major structural members of the wing elements, notably to the facing ends of the respective spars of the wing elements. The two coupling pieces 5, 6 run substantially parallel to the longitudinal span of the wing 1 and substantially perpendicular to the respective transverse faces 2a, 3a of the two wing elements 2, 3. To afford it some mechanical protection, the female coupling piece 6 is almost completely inset into the corresponding wing element 3.

Figure 2:
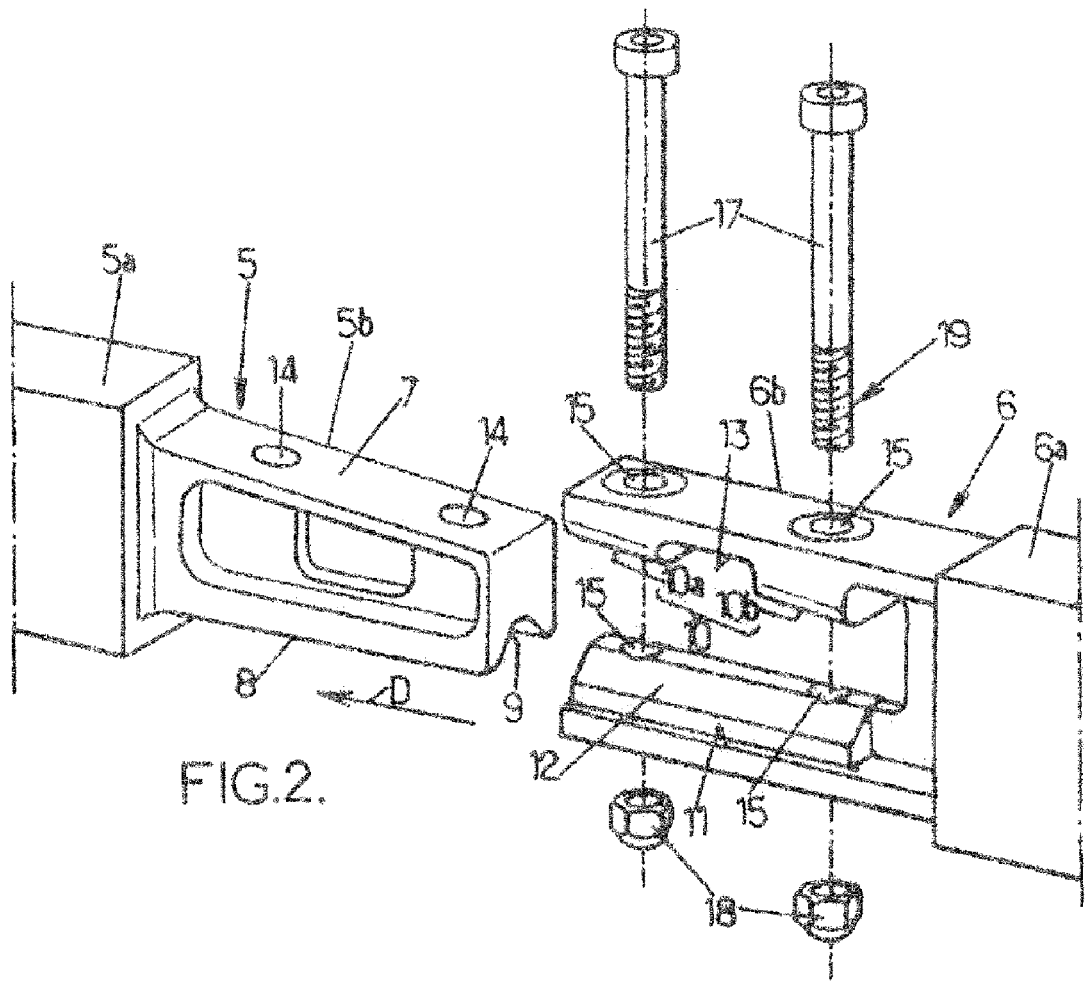
FIG. 2 is an exploded view of a dismantleable quick coupling means used in the wing of FIG. 1.
Figure 3:
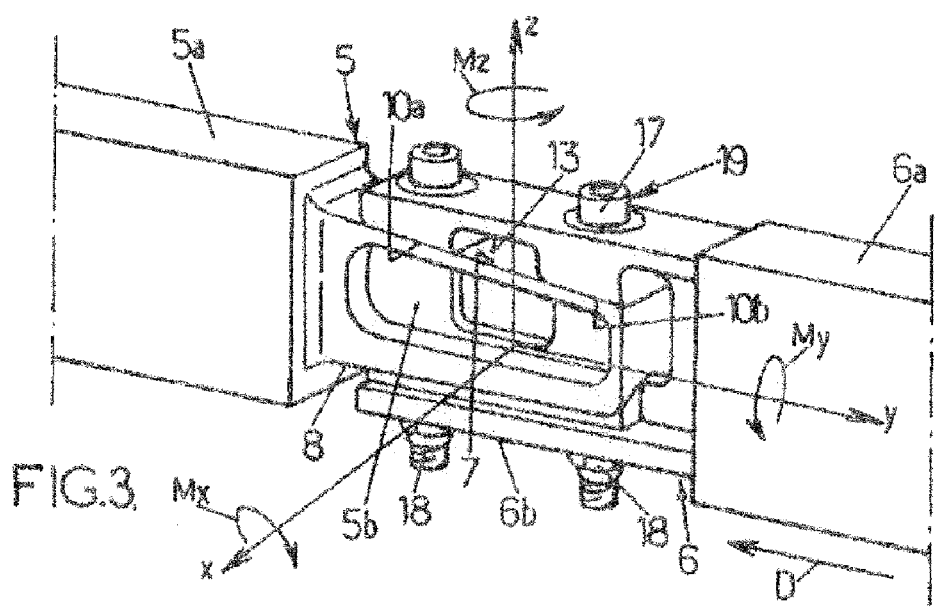
FIG. 3 is a view of the dismantleable quick coupling means of FIG. 2, illustrated in the assembled position.

As depicted in FIG. 1, but better visible in FIGS. 2 and 3, each coupling piece 5, 6 comprises a mounting end or base 5a, 6a respectively, which can be housed in a sleeve of the respective wing element 2, 3 and rigidly fastened thereto, possibly via the interposition of position-adjusting means.

As can be seen in FIG. 2, the male coupling piece 5 borne by the first wing element 2 has a free end 5b which runs substantially perpendicular to the aforementioned mounting end 2a and which has an upper face 7 and a lower face 8. The faces 7, 8 are separated from one another in a direction substantially transverse to the first wing element 2 and face away from one another.

A first of said faces, the upper face 7 in the example considered, is substantially planar.

The second of said faces, the lower face 8 in the example considered, has a longitudinally running relief with a substantially V-shaped cross section. In the example considered, the relief is a groove 9 of substantially V-shaped cross section.

The first and second faces 7, 8 are inclined relative to one another so that they converge toward the second face in the direction of their free end, such that the two faces have an overall wedge shape.

As visible still in FIG. 2, the female coupling piece 6 borne by the second wing element 3 has a free end 6b which exhibits an upper face 10 and a lower face 11 which are separated from one another and face toward one another lying facing each other.

A first of said faces, the upper face 10 in the example considered, is substantially planar.

The second of said faces, the lower face 11 in the example considered, comprises a longitudinally running relief of substantially V-shaped cross section, of a shape that complements that of the V-shaped cross section of the relief of the second face (the lower face 8 in the example considered) of the male coupling piece 5. In other words, in the embodiment considered, the relief of the lower face 11 is a projection or rib 12 of V-shaped cross section that complements the V-shaped cross section of the groove 8.

The first and second faces 10, 11 are inclined relative to one another so that they diverge from one another toward their free end, this mutual inclination being the complement of that of the aforementioned mutually inclined faces 7, 8 of the male coupling piece 5.

In practice, there are various solutions that may be adopted. It is possible, as in the practical example illustrated in FIGS. 1 to 3, to contrive for it to be the aforementioned respective first faces 7, 10 of the coupling pieces 5, 6 that are inclined with respect to the longitudinal span of the wing, while the aforementioned respective second faces 8, 11 of coupling 5, 6 are substantially parallel to the longitudinal span of the wing.

However, it is also conceivable, if need be, for it to be the aforementioned respective second faces 8, 11 of the coupling pieces 5, 6 that are inclined with respect to the longitudinal span of the wing, while the aforementioned respective first faces 7, 10 of coupling 5, 6 are substantially parallel to the longitudinal span of the wing. Alternatively still, if need be, provision may be made for the aforesaid respective first faces 7, 10 and respective second faces 8, 11 of the coupling pieces 5, 6 all to be inclined with respect to the longitudinal span of the wing.

It will also be noted that other arrangements may be implemented that are able to afford the desired results. In particular, the respective shapings of the aforementioned upper and lower faces may be reversed, the lower faces 8, 11 being inclined and the upper faces 7, 10 being equipped with complementary reliefs. Likewise, the shapings of the faces, the faces 8, 11 in the example illustrated, with complementary reliefs may be reversed, the lower face 8 of the male coupling piece 5 being equipped with the V-section projection or rib and the lower face 11 of the female coupling piece 6 being provided with the V-section groove. In addition, the mounting of the male and female coupling pieces may be reversed, the male coupling piece 5 being mounted on the fixed wing element 3 and the female coupling piece 6 being mounted on the removable wing element 2.

In the coupled position illustrated in FIG. 3, the inclination of the upper faces 7, 10 ensures correct longitudinal positioning of the two coupling pieces 5, 6 with respect to one another and, therefore, because of the precision with which the two coupling pieces 5, 6 are mounted on the respective wing elements 2, 3, ensures the correct positioning of the removable wing element 2 with respect to the fixed wing element 3.

Moreover, the collaborating faces 7, 10 and the mutually collaborating V-shaped faces of the groove 9 and of the projection 12 define three flat bearing surfaces which react the three torques, represented by the arrows Mx, My, Mz, liable to be applied with respect to an orthonormal frame of reference of axes x, y, z.

The two coupling pieces 5, 6 are held in the coupled position visible in FIG. 3, with their collaborating faces 7, 10; 8, 11 kept firmly pressed together, by retaining means denoted overall by the numerical reference 19. In one simple embodiment in which the retaining means used are of low weight and small bulk, this function may be afforded by bolting. Although one single bolt may be sufficient for assembly purposes, it is, however, easier and safer to provide a number of bolts, preferably two bolts distant from one another, which can then be of a smaller diameter and easier to fit through the coupling pieces 5, 6.

To this end, the coupling pieces 5, 6 are pierced with holes transverse to their aforementioned respective first and second faces 7, 8; 10, 11. In FIG. 2, the holes transverse to the faces 7, 8 of the male coupling piece 5 are labeled 14 and the holes transverse to the faces 10, 11 of the female coupling piece 6 are labeled 15.

In the mounted position, each hole 14 in the male coupling piece 5 is aligned with two flanking holes 15 in the female coupling piece 6 and together they define a through-passage able to accept a threaded fastener 17 such as a bolt that accepts a nut 18. FIGS. 2 and 3 illustrate a configuration using two bolts 17.

To improve the quality with which the two, male 5 and female 6, coupling pieces are clamped together, it is advantageous to reduce the contact surfaces level with the threaded fastener or fasteners 17. To this end, in the configuration employing two fasteners 17 illustrated by way of example, provision may be made for the face 10 of the female coupling piece 6 to be hollowed centrally at 13; said face 10 then takes the form of two bearing pads 10a, 10b of reduced surface area situated longitudinally one on each side of the central hollow 13. A similar arrangement may be made for the face 11 opposite; however, in the example depicted, the face 11 of the female coupling piece 6 has been kept with a continuous structure in order to avoid catching and knocking when the two coupling pieces 5 and 6 are being assembled.

A single coupling means 4 may be sufficient to provide reliable mechanical assembly of the two wing elements 2, 3. However, one wing element (or both) may exhibit flexibility that may lead to relative deformations of the two facing assembly faces of the wing elements in its part distant from the coupling means 4. It is therefore beneficial to provide an additional means of holding the two wing elements distant from the coupling means 4, for example in the form of a simple means of resting flat against one another as depicted at 19 in FIG. 1, or alternatively by providing another, identical, coupling means 4 fitted some distance away; in such a case, the connections become statically redundant and adjusting means need to be provided on at least one of the coupling means in order to allow adjustment of the positioning of its male piece and/or of its female piece on the respective wing element.

The invention claimed is:

1. An aircraft wing having a longitudinal span and consisting of at least two wing elements positioned end to end, a first wing element being secured, dismantleably, to an adjacent second wing element using at least one coupling means, wherein said coupling means comprises:
a male coupling piece borne by said first wing element substantially parallel to said longitudinal span of said wing, said male coupling piece having a mounting end for mounting on said wing element and a free end and exhibiting an upper face and a lower face which are separated from one another and face outward away from one another,
a first of said faces being substantially planar,
a second of said faces comprising a relief running longitudinally with a substantially V-shaped cross section, and
said first and second faces being inclined with respect to one another so that said first and second faces converge toward one another toward said free end thereof;
a female coupling piece borne by said second wing element substantially parallel to said longitudinal span of said wing, said female coupling piece having a mounting end for mounting on said second wing element and a free end and exhibiting an upper face and a lower face which are separated from one another and positioned facing one another,
a first of said faces being substantially planar,
a second of said faces comprising a relief running longitudinally with a substantially V-shaped cross section, of a shape that complements the shape of said V-shaped cross section of said relief of said second face of said male coupling piece, and
said first and second faces being inclined with respect to one another so that said first and second faces diverge from one another toward said free end, with an inclination with respect to one another which is the complement of an inclination of said mutually-inclined faces of said male coupling piece, and
retaining means capable of holding said two coupling pieces in a coupled position with said respective cooperating upper and lower faces thereof kept firmly pressed together,
by virtue of which, when said two coupling pieces are in said coupled position said coupling pieces are immobilized relative to one another against any relative rotation.

2. The aircraft wing as claimed in claim 1, wherein said respective first faces of said coupling pieces are inclined with respect to said longitudinal span of said wing, whereas said respective second faces of said coupling pieces are substantially parallel to said longitudinal span of said wing.

3. The aircraft wing as claimed in claim 2, wherein said substantially planar and inclined first faces of said male and female coupling pieces respectively are said respective upper faces therefore, and said faces of said respective male and female coupling pieces that are equipped with complementary reliefs are their respective lower faces.

4. The aircraft wing as claimed in claim 2, wherein said substantially planar first face of said female coupling piece exhibits a central hollow and two bearing pads situated longitudinally on each side of said central hollow.

5. The aircraft wing as claimed in claim 1, wherein said respective second faces of said coupling pieces are inclined with respect to said longitudinal span of said wing, whereas said respective first faces of said coupling pieces are substantially parallel to said longitudinal span of said wing.

6. The aircraft wing as claimed in claim 1, wherein said respective first faces and respective second faces of said coupling pieces are inclined with respect to said longitudinal span of said wing.

7. The aircraft wing as claimed in claim 1, wherein said longitudinally running relief of substantially V-shaped cross section provided on said second of said faces of said male coupling piece is a groove and said longitudinally running relief of substantially V-shaped cross section of complementary shape provided on said second of said faces of said female coupling piece is a projection.

8. The aircraft wing as claimed in claim 1, wherein, in order to form said retaining means that hold said two coupling pieces in said coupled position, said coupling pieces are pierced with holes that are transverse to said respective first and second faces and mutually aligned when said two coupling pieces are in said coupled position in order to define at least one through-passage, and at least one threaded fastener is engaged through said at least one passage in order to hold said two coupling pieces in said coupled position.

9. The aircraft wing as claimed in claim 8, wherein said transverse holes provided in said male and female coupling pieces define, when said two coupling pieces are in said coupled position, two through-passages longitudinally distant from one another, and two threaded fasteners are engaged through said two respective passages.

* * * * *